United States Patent
Hasegawa et al.

(10) Patent No.: US 9,632,949 B2
(45) Date of Patent: Apr. 25, 2017

(54) STORAGE MANAGEMENT METHOD, STORAGE MANAGEMENT SYSTEM, COMPUTER SYSTEM, AND PROGRAM

(71) Applicant: International Business Machines Corporation, Armonk, NY (US)

(72) Inventors: Tohru Hasegawa, Tokyo (JP); Masayuki Iwanaga, Urayasu (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/800,284

(22) Filed: Jul. 15, 2015

(65) Prior Publication Data
US 2016/0117259 A1   Apr. 28, 2016

(30) Foreign Application Priority Data
Oct. 28, 2014   (JP) .................. 2014-219190

(51) Int. Cl.
   *G06F 12/12*   (2016.01)
   *G06F 12/121*   (2016.01)

(52) U.S. Cl.
   CPC .... *G06F 12/121* (2013.01); *G06F 2212/1024* (2013.01); *G06F 2212/313* (2013.01); *G06F 2212/69* (2013.01)

(58) Field of Classification Search
   CPC .................................................. G06F 12/121
   See application file for complete search history.

(56) References Cited

U.S. PATENT DOCUMENTS 8,977,827 B1 *   3/2015   Sims .................. G06F 11/1451
                                                             369/30.06
9,043,530 B1 *   5/2015   Sundaram ............... G06F 3/068
                                                             711/100

(Continued)

FOREIGN PATENT DOCUMENTS

JP   07013701 A   1/1995
JP   08030397 A   2/1996

(Continued)

OTHER PUBLICATIONS

Hasegawa et al., "Storage Management Method, Storage Management System, Computer System, and Program," English Translation Application and Drawings, Filed on Oct. 28, 2014, p. 1-56, Japan Patent Application Serial No. 2014-219190.

*Primary Examiner* — David X Yi
*Assistant Examiner* — Zubair Ahmed
(74) *Attorney, Agent, or Firm* — Peter J. Edwards

(57) ABSTRACT

A storage management method and the like for managing a hierarchical storage are provided. A storage management method is provided for managing a hierarchical storage including a lower storage tier, and a higher storage tier having higher speed than the lower storage tier, on a computer system including at least one computer. This storage management method includes a step of causing the computer system to copy a target data item from the higher storage tier to the lower storage tier, and a step of causing the system to determine whether or not to delete the entity of the data item on the higher storage tier having been subjected to the copying based on a time required for reading the copy of the data item.

20 Claims, 13 Drawing Sheets

(56) References Cited

U.S. PATENT DOCUMENTS

| | | | |
|---|---|---|---|
| 2004/0044849 A1* | 3/2004 | Stence | G06F 3/0611 |
| | | | 711/126 |
| 2005/0246386 A1 | 11/2005 | Sullivan et al. | |
| 2006/0069886 A1 | 3/2006 | Tulyani | |
| 2006/0136525 A1 | 6/2006 | Akelbein | |
| 2008/0222108 A1* | 9/2008 | Prahlad | G06F 17/30616 |

FOREIGN PATENT DOCUMENTS

| | | |
|---|---|---|
| JP | 09161405 A | 6/1997 |
| JP | 11031376 A | 2/1999 |
| JP | 2000020247 A | 1/2000 |
| JP | 2003323266 A | 11/2003 |
| JP | 2005115606 A | 4/2005 |
| JP | 2006039942 A | 2/2006 |
| JP | 2006163454 A | 6/2006 |
| JP | 2007226596 A | 9/2007 |
| JP | 2007323589 A | 12/2007 |
| JP | 2009098941 A | 5/2009 |
| JP | 2009211569 A | 9/2009 |
| JP | 2010152603 A | 7/2010 |
| JP | 2010536079 A | 11/2010 |
| JP | 2011222043 A | 11/2011 |
| JP | 2012098965 A | 5/2012 |
| JP | 2013101506 A | 5/2013 |
| JP | 2014123254 A | 7/2014 |
| WO | 2009133605 A1 | 11/2009 |

\* cited by examiner

STORAGE MANAGEMENT METHOD, STORAGE MANAGEMENT SYSTEM, COMPUTER SYSTEM, AND PROGRAM

FIELD OF INVENTION

The present invention relates to a hierarchical storage, and more specifically to a storage management method for managing the hierarchical storage, a storage management system, a computer system, and a program.

BACKGROUND

Software referred to as an LTFS (Linear Tape File System) allowing access to a tape medium via an interface of a typical file system has been provided. The LTFS has open specifications, and is achieved by storing data on a tape medium in a format according to an LTFS format. The LTFS is implemented by multiple vendors, such as International Business Machines™ Corporation, Oracle™ Corporation, Hewlett-Packard™ Company, and Quantum™ Corporation.

Use of the LTFS allows applications having previously used hard disk drives to access tape media without any change. Furthermore, a hierarchical storage has been configured where the LTFS is hierarchized as a secondary storage tier for a high-speed storage tier, such as HDDs or SSDs, without directly accessing files on the LTFS. This configuration can prevent the applications from timeout due to a required time period for accessing the files on tape media that is longer than an assumed time.

In the hierarchical storage, a high-speed storage is typically configured as a primary storage tier, and the applications store files in the high-speed storage. At a specific timing, the files are migrated to tape media on a secondary storage tier. After the migration, files that are referred to as stub files and indicate the presence of the files are stored on the primary storage tier. In the case where a file is subbed, an access from an application to the file causes the file to be read from the secondary storage tier and migrated to the primary storage tier, and the access is thus responded.

As to such a stub scheme, for example, JP2010-536079A (Patent Literature 1) has been known. Patent Literature 1 discloses a configuration in which an inode for a migration target file is held in an online storage as a stub file which is viewed as an original file from user applications in order to secure transparency of HSM operations.

As described above, stubbed files having no entity on the primary storage tier are read from tape media on the secondary storage tier. However, the tape media typically span at least 800 m in the longitudinal direction. Accordingly, the time required for locating varies according to the storage positions on the tape media where files are recorded. This variation classifies files into files that require a short response time for an access, and files that require a long response time. Therefore, a technique capable of managing a file space so as to minimize the number of files having long response times in a hierarchical storage as much as possible has been desired to be developed.

SUMMARY

The present invention has been made in view of insufficiencies in the conventional technique, and has an object to provide a storage management method, a storage management system, a computer system, and a program that can improve the response time for access in a hierarchical storage including a lower storage tier and a higher storage tier.

In order to solve the problems, the present invention provides a storage management method for managing a hierarchical storage including a lower storage tier, and a higher storage tier having higher speed than the lower storage tier, on a computer system including at least one computer. This method has the following characteristics. In the storage management method, the computer system copies a target data item from the higher storage tier to the lower storage tier. The computer system then determines whether or not to delete an entity of the data item on the higher storage tier having been subjected to the copying, based on a time required for reading a copy of the data item.

Furthermore, the present invention provides a storage management system that includes at least one computer for managing the hierarchical storage. This storage management system includes: a copy manager managing copying a target data item from the higher storage tier to the lower storage tier; and a deletion manager determining whether or not to delete an entity of the data item on the higher storage tier having been subjected to the copying, based on a time required for reading a copy of the data item.

Moreover, the present invention provides a computer system that includes: a processor; a memory communicating with the processor; and at least one interface device for communicating with a lower storage tier and a higher storage tier. In this computer system, the processor determines whether or not to delete an entity of a data item on the higher storage tier having been subjected to copying, based on a time required for reading a copy of the data item, the entity and the copy of the data item being on the higher storage tier, and the lower storage tier, respectively, and stores, on the higher storage tier, information for accessing the copy of the data item on the lower storage tier having been subjected to the copying and being determined to be deleted.

Furthermore, the present invention provides a computer program for managing the hierarchical storage. This program is read onto the memory, and causes a computer to function as: a copy manager managing copying a target data item from the higher storage tier to the lower storage tier; and a deletion manager determining whether or not to delete an entity of the data item on the higher storage tier having been subjected to the copying, based on the required time.

This configuration can improve the response time for access in the hierarchical storage including the lower storage tier and the higher storage tier.

DETAILED DESCRIPTION

Embodiments of the present invention are hereinafter described. However, the embodiments of the present invention are not limited to embodiments described below. The following embodiments are described with reference to examples where a file space management method executed by a hierarchical storage management system, and the hierarchical storage management system for executing the file space management method are adopted as a storage management method, and a storage management system, respectively.

Figure 1:
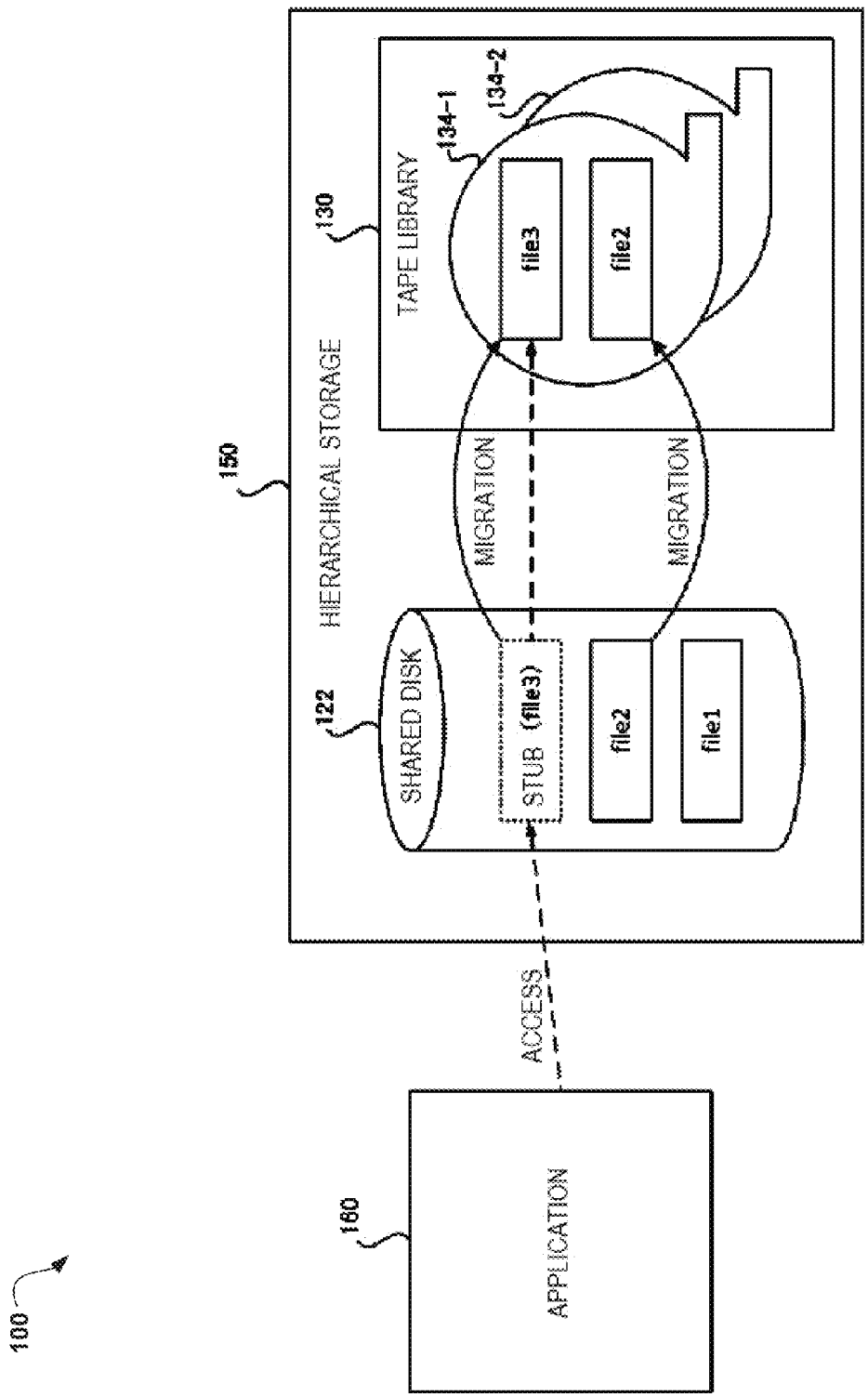
FIG. 1 is a schematic diagram showing a hierarchical storage management system according to an embodiment of the present invention.
Figure 2:
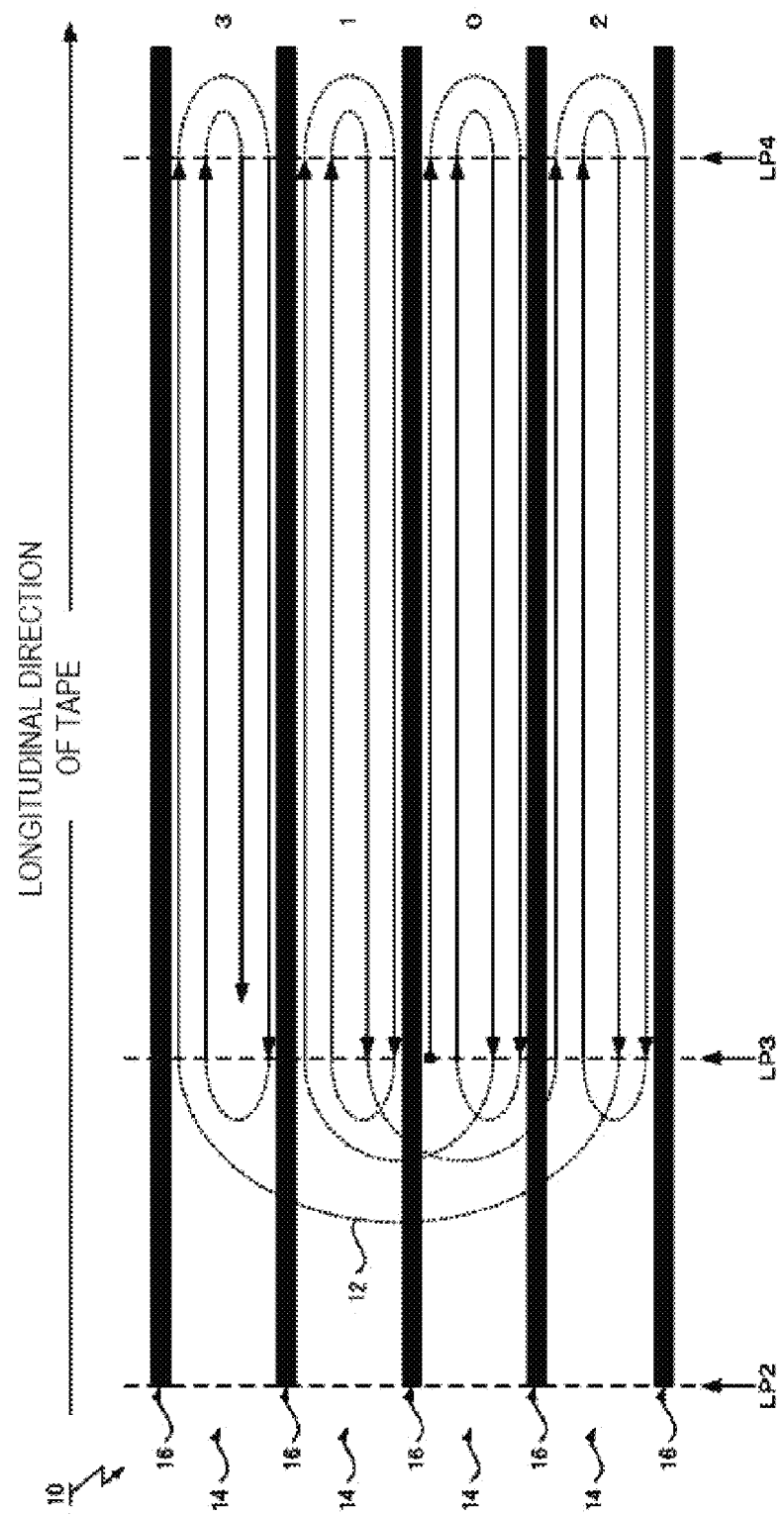
FIG. 2 is a diagram showing a layout of an LTO Ultrium format of a tape medium used for the hierarchical storage management system according to the embodiment of the present invention.

FIG. 1 is a diagram showing an overview of a hierarchical storage management system 100 according to an embodiment of the present invention. FIG. 2 is a diagram showing a layout of a format of a tape medium 10 used by the hierarchical storage management system 100 according to the embodiment of the present invention, with reference to an example of LTO Ultrium.

The hierarchical storage management system 100 shown in FIG. 1 includes a shared disk 122 as a primary storage tier, and a tape library 130 including one or more tape media 134 as a secondary storage tier. The primary storage tier and the secondary storage tier configure a two-tier hierarchical storage 150 in the embodiment herein described.

An application 160 requests a file system that manages a hierarchical storage 150 to store and read a file. When the application 160 requests the file system to store a file, the hierarchical storage 150 stores the file in a shared disk 122, which is the primary storage tier. The file stored in the shared disk 122 is internally copied onto a tape medium 134 in the tape library 130, which is the secondary storage tier, at a specific timing such as a timing when the disk usage ratio exceeds a specific threshold, and a timing when a time designated by a user is reached. After copied, the file on the primary storage tier is timely replaced with a stub file that represents the presence of the file, and is recognized as an original file by the application 160. That is, the entity of the file on the primary storage tier is deleted, and information for accessing the copy of the file on the tape medium 134, which is the copy destination, on the secondary storage tier is stored on the primary storage tier.

Here, major three states of files in the hierarchical storage 150 are defined. A file which is on the primary storage tier but is not on the secondary storage tier is in a resident state. When a new file is created or a file is updated, the file is in the resident state. A file which is on the primary storage tier and is stubbed on the primary storage tier after a copy of the file is created on the secondary storage is in a migrated state. This state corresponds to a state where migration to the secondary storage has been completed. A file whose entity is on the primary storage tier and whose copy is on the secondary storage tier is in a pre-migrated state. This state corresponds to a state where migration has been made to the secondary storage but has not been completed yet and is not in the migrated state. In FIG. 1, "file 1" is in the resident state, "file 2" is in the pre-migrated state, and "file 3" is in the migrated state.

In the state shown in FIG. 1, when a file in the migrated state (e.g., file 3) is accessed from the application 160, the access is processed as indicated by broken lines in FIG. 1. In this case, the file to be accessed is stubbed in the shared disk 122. Thus, the application 160 generates a request for accessing the stub file recognized as the original file. The file system internally recalls, onto the primary storage tier, the copy of the file concerned from a tape medium 134-1, which is the migration destination of the file concerned, on the secondary storage tier, and responds to the access request after temporarily storing the file on the primary storage tier, or directly responds.

In recall of the copy of the file concerned, the copy of the file on the tape medium 134 is internally read via a file system for tape (LTFS) for managing the tape library 130. Here, the time required for reading varies depending on the storage position where the copy of the file is written on the tape medium 134. That is, even in cases of access to a file stubbed in the same manner, the application 160 recognizes the response time for reading a certain file from the tape medium to be relatively shorter, but relatively longer for another file, depending on the physical storage position of the copy of the file on the tape medium.

This is because a tape drive that supports a tape format, such as LTO, writes data on the tape medium while the writing position moves forward and backward many times in the longitudinal direction of a tape spanning several hundred meters as shown in FIG. 2.

As shown in FIG. 2, the tape medium 10 in conformity with LTO specifications adopts a linear recording scheme. Data tracks are provided in the direction parallel to the longitudinal direction of the tape. The width direction of the tape medium 10 is divided into four data bands 14 sandwiched by servo bands 16. Numbers are assigned to the four data bands 14, and data is written according to the order of the numbers. The longitudinal direction of the tape medium is divided into multiple areas by multiple logical points (LP). FIG. 2 shows LP2, and LP3 and LP4 for delimiting user data areas.

Data writing is along a path in the forward direction from a beginning of tape (BOT) side to an end of tape (EOT) side, and a path in the backward direction from the end (EOT) side to the beginning of tape (BOT) side. The path is also referred to as a wrap. Multiple warps are included per data band.

When the EOT is reached on the path in the forward direction, the head position is moved in the vertical direction and registered below the same data band, and writing is started in the backward direction. Repetition of this operation allows a large amount of data can be recorded in one tape. According to such forward and backward movement 12, recording is performed from the beginning of the recording area of the tape along the traveling direction of the tape, turns back at the end of the recording area, and is restarted toward the beginning. Thus, this scheme is also referred to as a serpentine recording scheme.

According to the format, a file written from a position near the logical point (LP3) on the beginning of tape (BOT) side where the tape medium is mounted and data is started to be written has a short movement distance required for locating from the beginning. This file can therefore be started to be read in a short time. In contrast, a file written from a position near the logical point (LP4) at a turning-back position on the end (EOT) side in the longitudinal direction of the tape has a long movement distance required for locating. This file therefore requires a long time to be read.

To address this problem, the hierarchical storage management system 100 according to the embodiment of the present invention adopts a configuration that determines whether or not to timely copy a target file from the primary storage tier to the secondary storage tier to bring the file into the pre-migrated state, stubs the file in the pre-migrated state, and deletes the entity on the primary storage tier, based on the time required for reading the copy of the data according to the storage position on the tape medium 134, which is the copy destination, on the secondary storage tier. Accordingly, the file space is managed such that files having long required times depending on the storage positions tend to remain on the primary storage tier, and reduces the number of files having long response times in the hierarchical storage 150 as much as possible to improve reduction in response time in its entirety.

Hereinafter, referring to FIGS. 3 to 10, a file space management function achieved in the hierarchical storage management system 100 according to the embodiment of the present invention is described.

Figure 3:
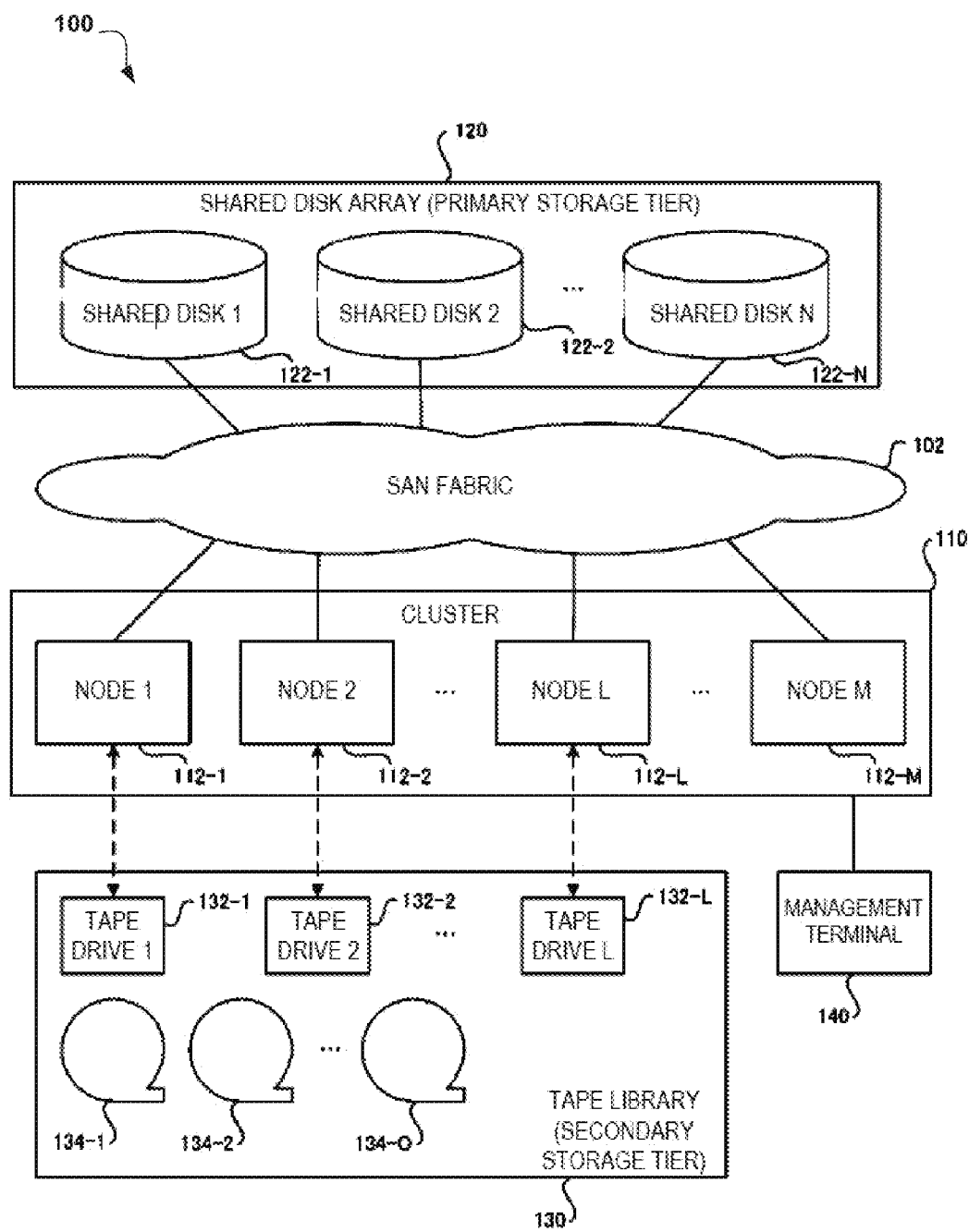
FIG. 3 is a system configuration diagram of the hierarchical storage management system according to the embodiment of the present invention.

FIG. 3 is a diagram showing a system configuration of the hierarchical storage management system 100 according to the embodiment of the present invention. The hierarchical storage management system 100 shown in FIG. 3 includes a cluster 110 that includes at least one node 112, and achieves a file system for managing the hierarchical storage 150 on the cluster 110.

In the embodiment shown in FIG. 3, the hierarchical storage 150 includes a shared disk array 120 that includes one or more shared disk 122 as the primary storage tier. Each of the nodes 112 in the cluster 110 is mutually connected to each of the shared disks 122 in the shared disk array 120 via a SAN (Storage Area Network) fabric 102. The SAN fabric 102 is not limited to a specific one, and may be a fiber-channel-network-based FC-SAN that includes a fiber channel switch, a TCP/IP (Transmission Control Protocol/Internet Protocol)-network-based IP-SAN that includes an LAN (Local Area Network) switch, or a combination of these SANs.

The multiple nodes 112 share each shared disk 122. The nodes 112 directly access the shared disk 122 via the SAN fabric 102, and provide indirect file access to another client node that is not connected to the SAN fabric 102. Such a file system that is distributed over the one or more nodes 112 configuring the cluster 110 and accessible from the multiple nodes (including client nodes) is referred to as a distributed shared (parallel) file system. The distributed shared file system can provide a global name space, an input/output striping function spanning multiple nodes and the like.

The hierarchical storage 150 thus includes the shared disk array 120, and further includes the tape library 130 as the secondary storage tier. The tape library 130 includes one or more tape drives 132, and one or more tape media 134. The tape drives 132 configure a tape drive device in this embodiment. The nodes 112 in the cluster 110 are connected to the tape library 130 via the SAN fabric or cables of FC, LVD (Low Voltage Differential) SCSI (Small Computer System Interface), SAS (Serial Attached SCSI) or the like.

The tape library 130 is managed by a file system for the tape library, such as LTFS. Copies of the files migrated from the shared disk array 120 are stored on the one or more tape media 134 in the tape library 130. Although the tape media 134 are not specifically limited, it is preferred to adopt LTO (Linear Tape-Open) tape cartridges as the media.

The hierarchical storage management system 100 shown in FIG. 3 further includes a management terminal 140. The management terminal 140 is a terminal operated by an administrator of the hierarchical storage management system 100, and accepts, from the administrator, instructions including setting of a migration policy for the file migration described above.

According to the example shown in FIG. 3, the configuration is illustrated where the nodes 112-1 to 112-M are connected to the shared disks 122-1 to 122-N in the shared disk array 120, and the nodes 112-1 to 112-L are each connected to the tape drives 132-1 to 132-L of the tape library 130. It should, however, be noted that the system configuration shown in FIG. 3 is an example.

A system having a minimum configuration is a system that includes one shared disk 122, one node 112, and one tape drive 132. The shared disk array 120 may be further divided into multiple types of at least one off-line storage (high-speed disk) and at least one near-line storage (medium-speed disk) to achieve a three-tier (layer) configuration. A flash storage may be added as a cache. In the case of a three-tier configuration, the online storage configures the primary storage tier, the near-line storage configures the secondary storage tier, and the tape library configures the third storage tier.

Figure 4:
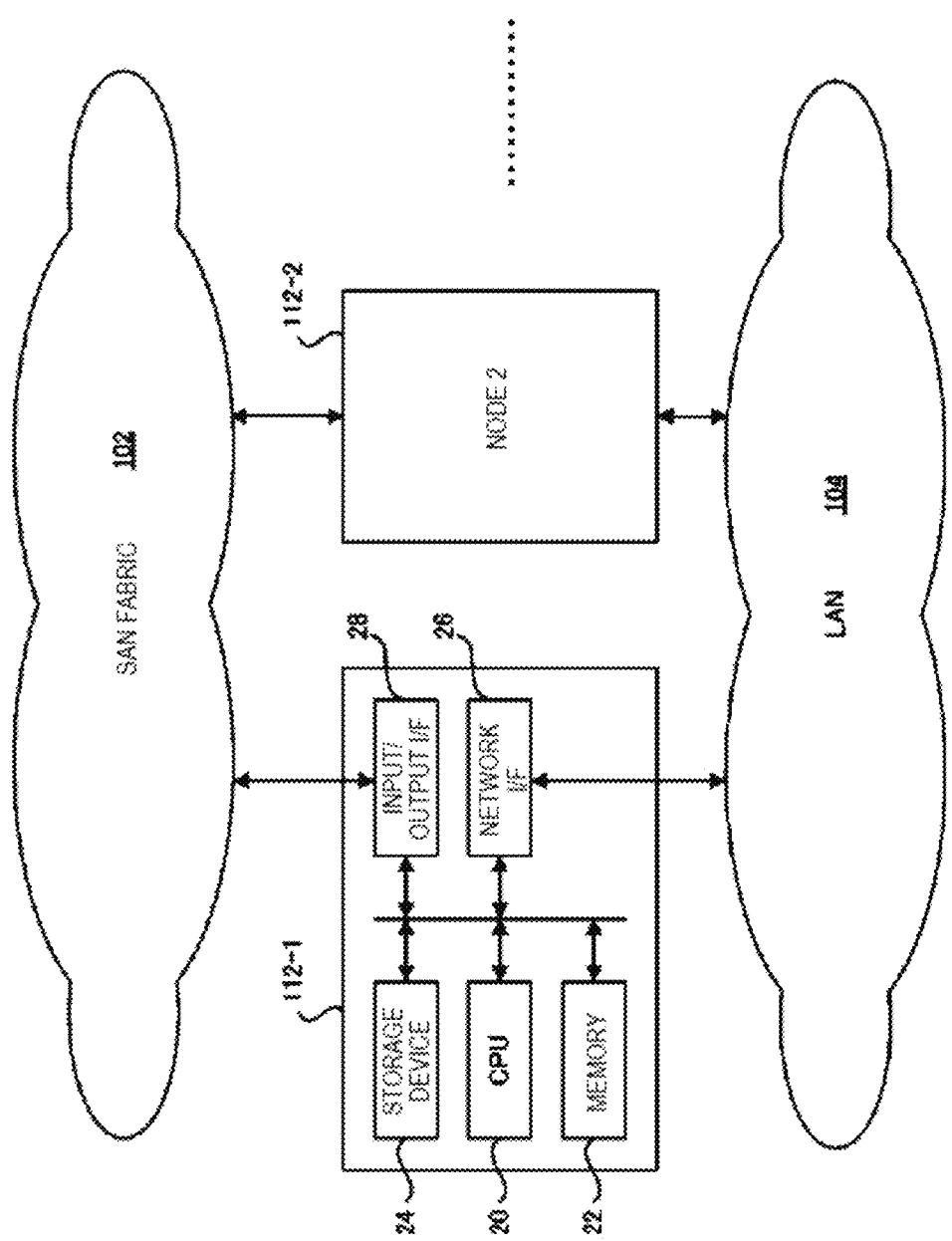
FIG. 4 is a hardware configuration diagram of a node included in a cluster of the hierarchical storage management system according to the embodiment of the present invention.

FIG. 4 is a diagram showing a hardware configuration of the nodes 112 configuring the cluster 110 of the hierarchical storage management system 100 according to the embodiment of the present invention. As shown in FIG. 4, the node 112 includes: a CPU (Central Processing Unit) 20; a memory 22, such as an SDRAM (Synchronous Dynamic Random Access Memory); a storage device 24, such as a ROM (Read Only Memory), a HDD (Hard Disk Drive), and a flash memory; a network interface device 26; and an input/output interface device 28.

The network interface device 26 is configured as a network adapter, such as a NIC (Network Interface Card), and connects the node 112 to a LAN 104. The input/output interface device 28 is configured as a network adapter, such as NIC, an HBA (host bus adapter), such as FC, or the like, and connects the node 112 to the SAN fabric 102. The nodes 112 may be interconnected by an HCA (host channel adapter), such as InfiniBand®.

The node 112 operates under control of the CPU 20 so as to read various types of programs stored in the storage device 24, develop the programs on the memory 22, and achieve after-mentioned functions and processes of which the node takes charge. Any specific hardware configuration diagram of the management terminal 140 is not shown. However, this terminal can be configured by including a CPU, a memory, storage device, and a network interface device, and further including user interfaces, such as a display, a keyboard, and a mouse, in the same manner. Any specific hardware configuration of the shared disk array 120 and the tape library 130 is not illustrated. The configuration may be achieved by including a CPU, a memory, a ROM, a network interface, an input/output interface, and another appropriate piece of hardware.

Figure 5:
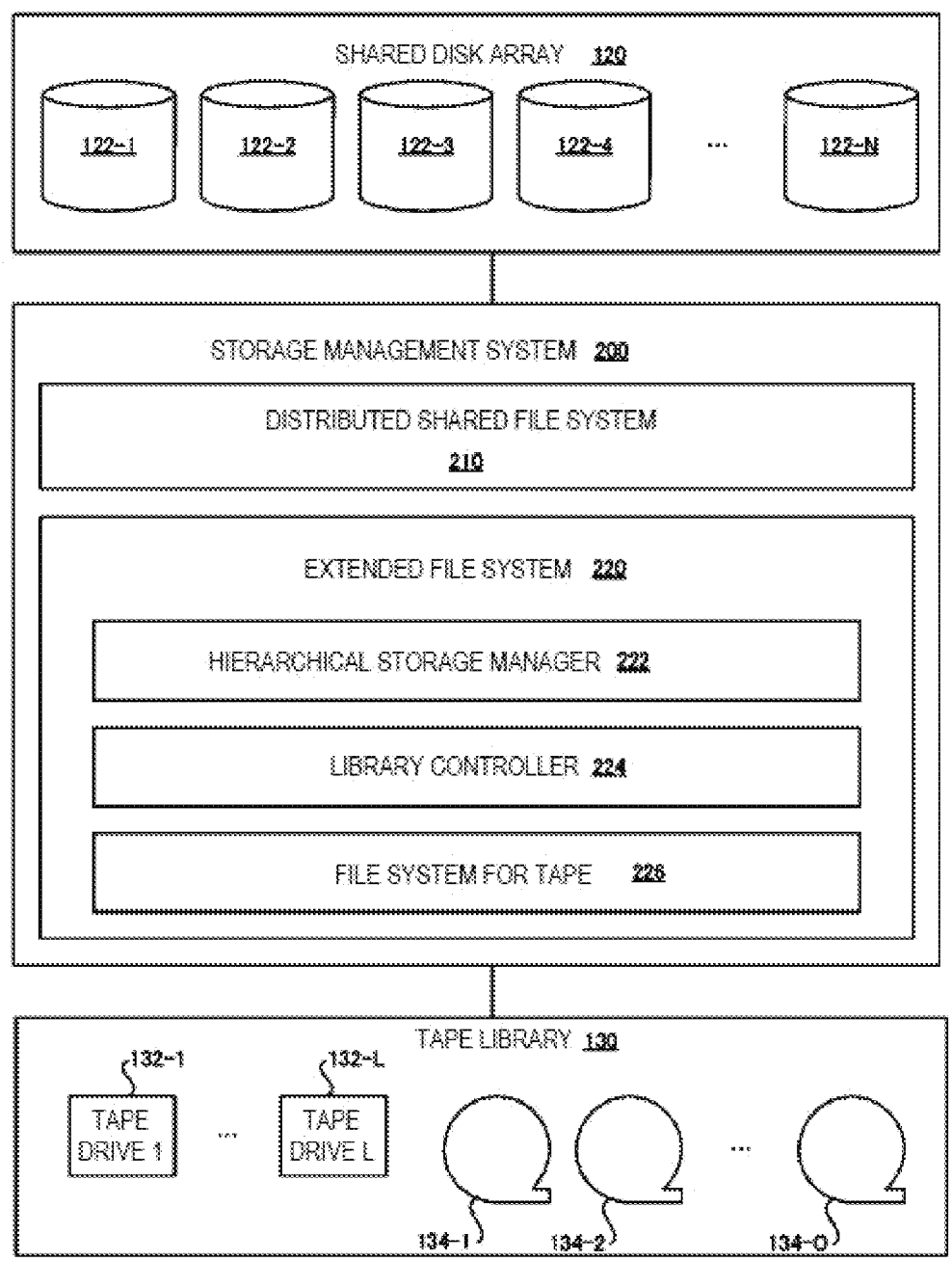
FIG. 5 is a software configuration diagram of the hierarchical storage management system according to the embodiment of the present invention.

FIG. 5 is a software configuration diagram of the hierarchical storage management system 100 according to the embodiment of the present invention. The hierarchical storage management system (hereinafter, simply referred to as a management system in some cases) 200 shown in FIG. 5 includes, as a software configuration, a distributed shared file system 210, and an extended file system 220.

Although not specifically limited, the distributed shared file system 210 may be, for example, a software component provided by GPFS (General Parallel File System®). The extended file system 220 provides an extended software component group that integrates the distributed shared file system 210 and the tape library 130. The extended file system 220 includes, as such components, a hierarchical storage manager 222, a library controller 224, and a file system for tape 226.

The hierarchical storage manager 222 is configured so as to manage the file space. The hierarchical storage manager 222 controls to automatically migrate appropriate files from the shared disks 122 to the tape library 130 on the basis of the migration policy. When a migrated file is accessed, the hierarchical storage manager 222 controls to automatically recall the file from the tape library 130 to a shared disk 122.

The library controller 224 controls selection of the tape medium 134 and the state of resources. The library controller 224 selects the tape medium on the basis of a cartridge selecting policy, and schedules and processes requests for migration and recall.

The file system for tape 226 can mount the tape library 130 as one file system onto the tape medium 134. The tape medium 134 in the tape library 130 is typically accessed as a subdirectory in the tape library. The file system for tape 226 operates on the nodes 112 connected to the tape drives 132, and accesses a recording area on the tape media 134 via the file system interface of LTFS.

In the embodiment herein described, it is described such that the tape library is mounted as one file system on the tape media 134. Alternatively, a mode may be adopted where a tape library is not configured, and a single tape drive is mounted as one file system.

In a specific embodiment using GPFS®, integration of the distributed shared file system 210 and the extended file system 220 are achieved through use of a package, such as LTFS EE (Linear Tape File System Enterprise Edition). In this case, the hierarchical storage manager 222, the library controller 224, and the file system for tape 226 are referred to as a hierarchical storage manager (HSM), a multi-tape management module (MMM), and an LTFS LE (Linear Tape File System Library Edition)+, respectively.

The application 160 shown in FIG. 1 recognizes the distributed shared file system 210 shown in FIG. 5. The file system for tape 226 for the tape library 130 is integrated into the distributed shared file system 210, and is internally used in the hierarchical storage management system 100. The integration enables management of the file space in the file system having a name space into which the disks and tapes are integrated. The hierarchical storage manager 222 takes charge of controlling the file space management. The details will be described later. Under control of the hierarchical storage manager 222, the file system for tape 226 takes charge of writing and reading files to and from the tape media 134. The details will be described later.

The components shown in FIG. 5 indicate a software configuration as the management system 200 that includes the cluster 110, and the management terminal 140, and can be implemented in at least one computer that configures the management system 200, in a distributed manner. In each computer, such as the node 112, corresponding software components cooperatively operate.

Figure 6:
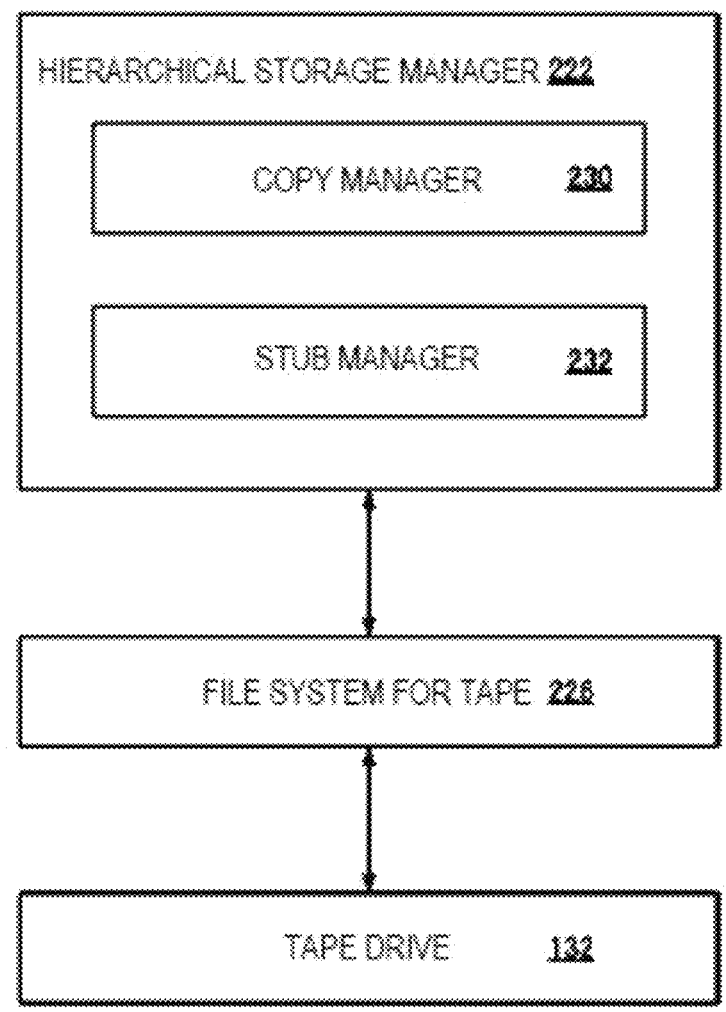
FIG. 6 is a detailed functional block diagram of a hierarchical storage manager in the hierarchical storage management system according to the embodiment of the present invention.

FIG. 6 is a diagram showing detailed functional blocks of the hierarchical storage manager 222 in the hierarchical storage management system 100 according to the embodiment of the present invention. FIG. 6 also shows the file system for tape 226, and the tape drive 132, as peripheral elements of the hierarchical storage manager 222. As shown in FIG. 6, the hierarchical storage manager 222 includes a copy manager 230, and a stub manager 232 in a more detailed view.

The copy manager 230 configures the copy manager of this embodiment that manages determining a target file to be copied on the basis of the predefined migration policy, and copying the target file from the primary storage tier to the secondary storage tier. Accordingly, the file transitions from the resident state to the pre-migrated state.

The stub manager 232 selects files which are to be stubbed and of which entities on the primary storage tier are to be deleted, from among the files in the pre-migrated state, on the basis of the predefined migration policy. The stub manager 232 configures a deletion manager of this embodiment that determines whether or not to delete the entities of the files in the pre-migrated state. If the stub manager 232 determines deletion, this manager deletes the entity of the corresponding file from the primary storage tier while storing, on the primary storage tier, a stub file for accessing the copy of the corresponding file on the tape medium, which is the copy destination, on the secondary storage tier. The file thus transitions from the pre-migrated state to the migrated state.

In the embodiment herein described, the migration policy includes a copy condition for determining whether or not to copy from the primary storage tier to the secondary storage tier, and a stub condition for determining whether or not to stub a file on the primary storage tier and delete the entity. The copy condition and the stub condition may each include the fact that the disk usage ratio exceeds a specific threshold, the fact that a time designated by the user is reached and the like, as conditions for starting determination. Also, the copy condition and the stub condition may each include a selection condition for selecting a file to be copied or stubbed. The selection condition in the copy condition can be defined on the basis of file attribute information such as the file creation date and time, last access date and time, and file size. Furthermore, the copy condition and the stub condition may include, as an end condition, any of the fact that all files satisfying the selection condition are copied or stubbed, and the fact that the disk usage ratio falls below the specific threshold.

For example, the copy condition may be defined so as to periodically start determining migration, and copy all files in the resident state with at least a certain time elapsed from the last access date and time. Alternatively, the copy condition may be defined so as to start determination of migration at a state where the disk usage ratio reaches 90%, and copy 20% of files in an ascending order of the last access time. Furthermore, a condition of limiting the targets as files having at least a certain file size (e.g., 1024 byte) may be added.

In the embodiment herein described, extended attribute information of a file is newly defined that is a time required for reading a copy of the file, the time being depending on the storage position on the tape medium, which is the copy destination, on the secondary storage tier. The stub condition described above is defined on the basis of this required time.

For example, the stub condition may be defined so as to start determination at a state where the disk usage ratio reaches 90%, and sequentially stub files in the pre-migrated state in an ascending order of the required time until the disk usage ratio falls below 80%. As with the copy condition, an additional limiting condition or evaluation condition on the file creation date and time, last access date and time, and file size may be added.

The file system for tape 226 instructs the tape drive 132 on the secondary storage tier to copy a target file that is be copied onto the tape medium 134, and receives, as a result of the process, a record number that is information on the logical position where the copy is written.

The tape drive 132 holds information on itself including an acceleration, a seek speed, a reading speed and the like, and has an ability of resolving the physical storage position on the basis of the logical record number. In the embodiment herein described, the tape drive 132 is provided with an interface for resolving the logical record number, and providing information on the time required for reading the copied file that includes the physical start position of the file corresponding to the record number, the distance from the beginning of the tape, and the physical end position.

The file system for tape 226 issues a command, such as e.g. an SCSI command, to query the tape drive 132 using the record number obtained as the result of the process of copying, and obtains information on the time required for reading the copied file from the tape medium 134 that is the copy destination. The obtained information on the required time is stored as meta information on the file, typically as an extended attribute, in the index of the tape medium 134. The file system for tape 226 configures a copy executor in this embodiment. The aforementioned hierarchical storage manager 222 can achieve determination based on the required time by obtaining the extended attribute stored in the index of the tape medium 134.

The time required for reading the copied file may be the time required for locating on the tape medium that is the copy destination, or the total time of the time required for locating and the time required for reading after the locating. It can be determined which alternative is adopted on the basis of the HSM specifications.

For example, an HSM has been known that, upon recall in response to file access, responds to the access by passing data on a file read from the primary storage tier to the application 160 without waiting until the entire file is stored on the primary storage tier. In such an HSM, the locating time strongly affects the response time. Meanwhile, another HSM has been known that, upon recall in response to file access, responds to the access by temporarily reading the entire file onto the primary storage tier and subsequently passing the data to the application 160 from the primary storage tier. In such an HSM, the total of the locating time and the file reading time strongly affects the response time.

Referring to FIG. 6, the file space management function through use of the time required for reading has been described using the detailed functional blocks of the hierarchical storage manager 222. However, the configuration is not limited to this example. For instance, in another embodiment, the function may be provided as another module that is different from the hierarchical storage manager 222 and controls the state of file using the time required for reading according to the embodiment of the present invention.

Hereinafter, referring to flowcharts of FIGS. 7 to 9 and a data structure shown in FIG. 10, a file space management method executed by the hierarchical storage management system 100 according to the embodiment of the present invention is described in detail. The file space management method of this embodiment includes a control flow that causes a file to transition from the resident state to the pre-migrated state, and a control flow that causes the file to transition from the pre-migrated state to the migrated state.

Figure 7:
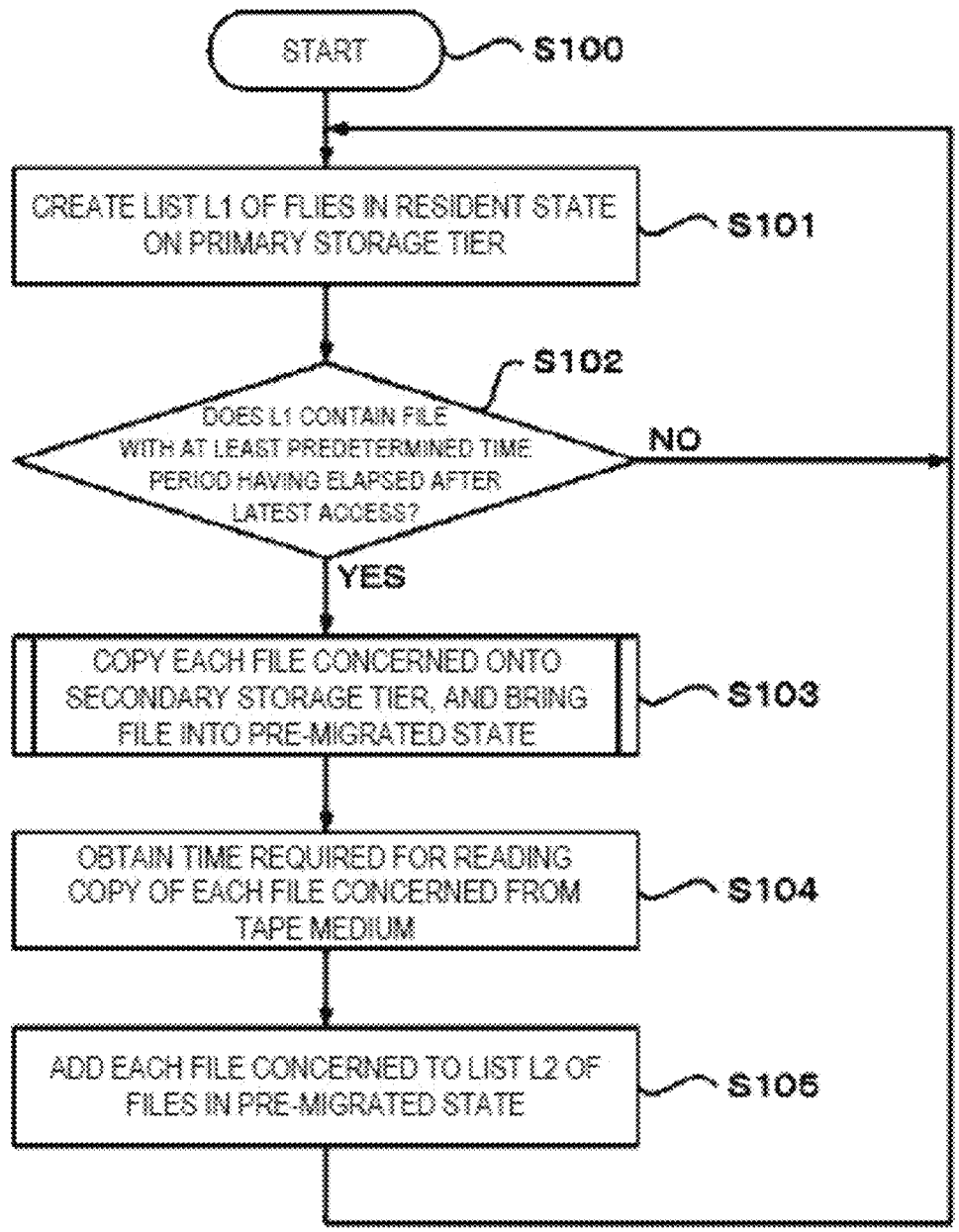
FIG. 7 is a flowchart showing a control flow executed by a copy manager in the hierarchical storage management system to cause files to transition from a resident state to a pre-migrated state according to the embodiment of the present invention.

FIG. 7 shows a control flow executed by the copy manager 230 in the hierarchical storage management system 100 according to the embodiment of the present invention to cause a file to transition from the resident state to the pre-migrated state. FIG. 8 shows a file copying process flow executed by the file system for tape 226 in the hierarchical storage management system 100 according to the embodiment of the present invention. FIG. 9 shows a control flow executed by the stub manager 232 in the hierarchical storage management system 100 according to the embodiment of the present invention to cause a file to transition from the pre-migrated state to the migrated state. Each of the flows shown in FIGS. 7 to 9 may be executed by any of the nodes 112 that configure the hierarchical storage management system 100.

Figure 9:
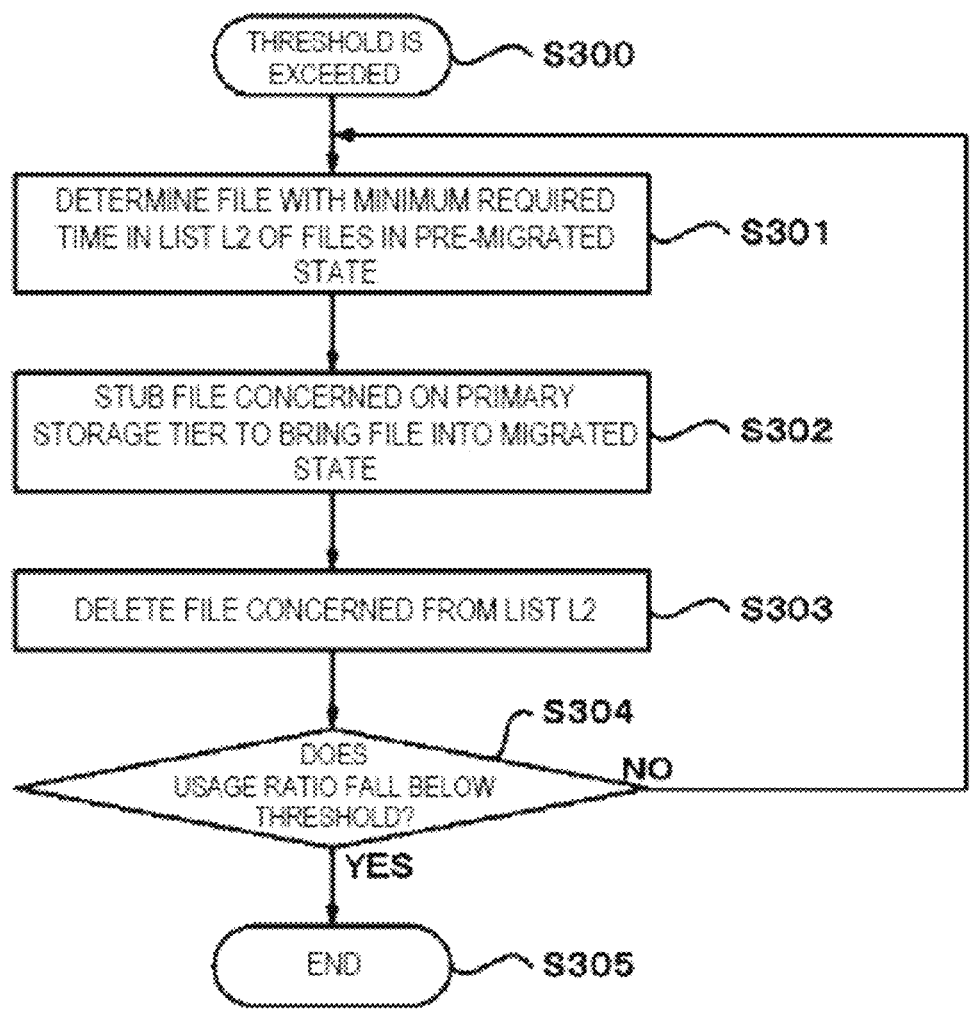
FIG. 9 is a flowchart showing a control flow executed by a stub manager in the hierarchical storage management system to cause files to transition from the pre-migrated state to a migrated state according to the embodiment of the present invention.
Figure 10:
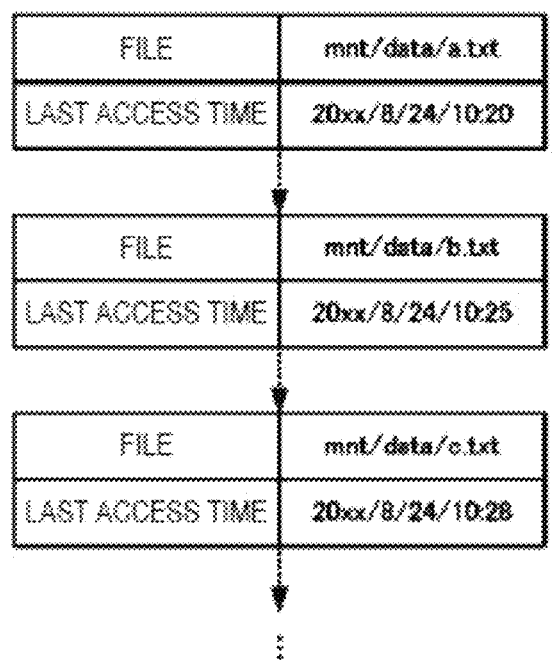
FIG. 10 is a diagram showing a data structure of a file list used in the hierarchical storage management system according to the embodiment of the present invention.
Figure 10:
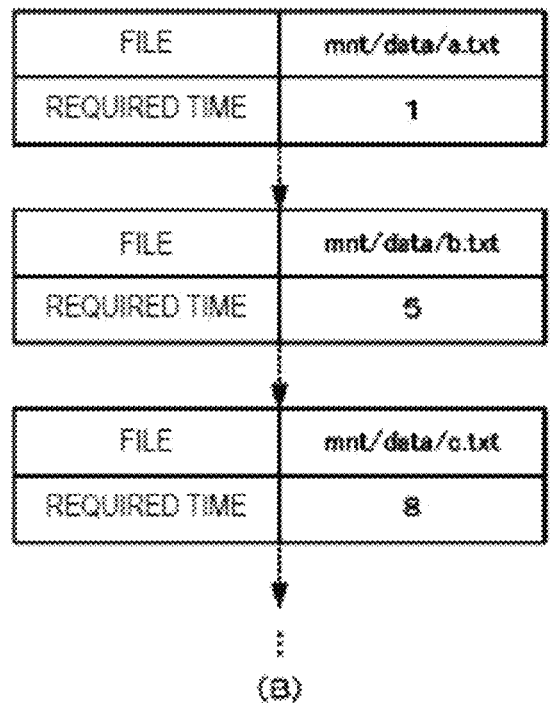

The controls shown in FIGS. 7 and 9 are based on the copy condition for periodically copying files in the resident state after at least predetermined time period is elapsed from the last access date and time, and the stub condition for sequentially stubbing files in the pre-migrated state in an ascending order of the required time until the disk usage ratio falls below a second threshold in response to the disk usage ratio reaching a first threshold. FIG. 10 is a diagram showing a data structure of a file list generated and used according to such a migration policy in the hierarchical storage management system 100 according to the embodiment of the present invention.

The processes shown in FIG. 7 are started in step S100, for example, in response to start of the service of the hierarchical storage manager 222. In step S101, the copy manager 230 creates a list L1 of files in the resident state on the primary storage tier. For example, as shown in FIG. 10(A), the list L1 can be sorted according to the last access date and time to assign the orders. In step S102, the copy manager 230 determines whether or not the list L1 contains a file with at least a predetermined time having elapsed after the last access. In step S102, if it is determined that the list L1 contains no file with at least the predetermined time period having elapsed after the last access (NO), the processing is waited for a certain time and loops back to step S101.

In contrast, if it is determined that the list contains a file with at least the predetermined time period having elapsed after the last access in step S102 (YES), the processing proceeds to step S103. Absence of access for at least a certain time is thus confirmed here, because data writing and change of a timestamp are often sequentially performed immediately after creation of a file and therefore it is intended to sufficiently wait for a state where writing is not performed any more. In step S103, the copy manager 230 causes the file system for tape 226 to copy each of the files concerned to the secondary storage tier, and brings the file into the pre-migrated state.

Figure 8:
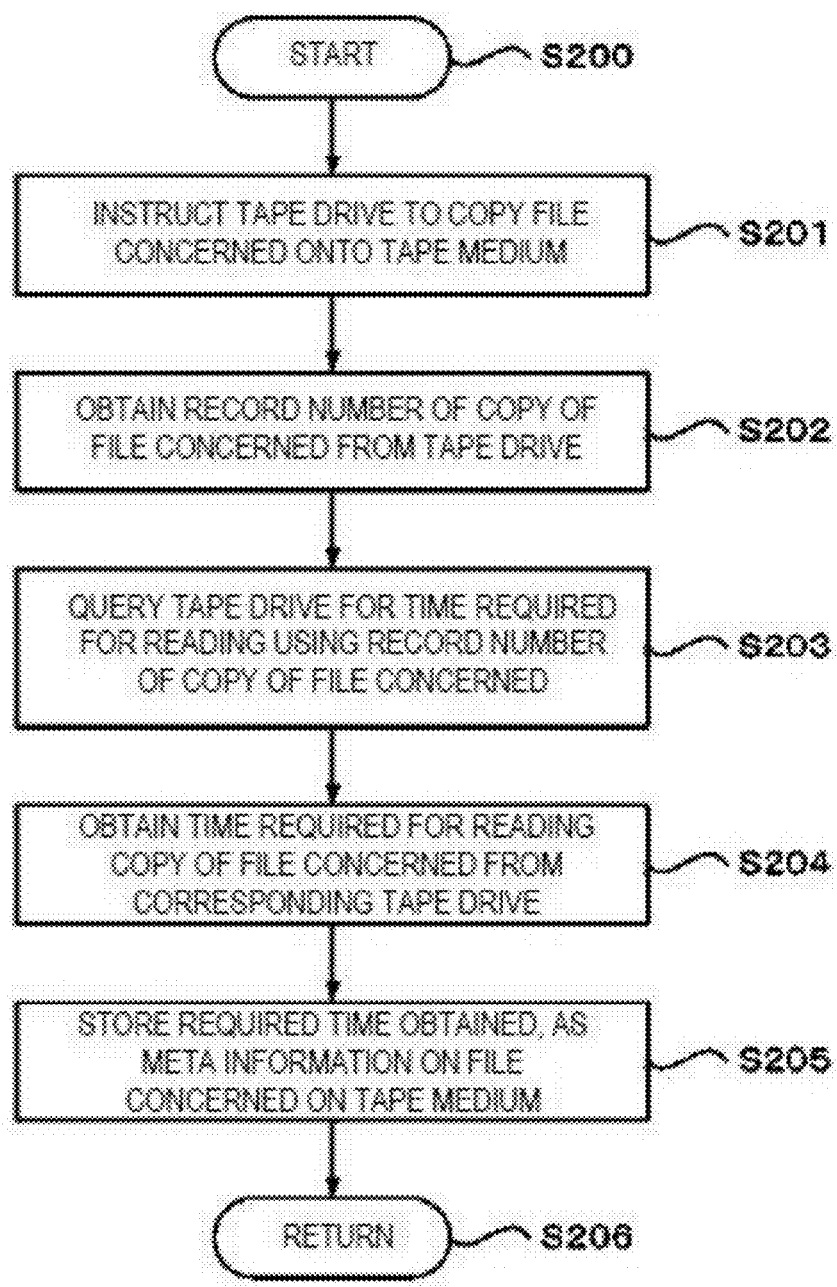
FIG. 8 is a flowchart showing a file copying process executed by a file system for tape in the hierarchical storage management system according to the embodiment of the present invention.

In step S103 shown in FIG. 7, a process flow shown in FIG. 8 is called. The processes shown in FIG. 8 can be typically executed by a node having received the request of execution of file transition issued by the node taking charge of the control shown in FIG. 7. Note that multiple files to be copied may be classified into groups, and executed by different nodes in parallel. Such a mode is not avoided.

The processes shown in FIG. 8 are called in step S103 shown in FIG. 7, and started in step S200. In step S201, the node 112 having received the request instructs the tape drive 132 to copy the file concerned onto the tape medium. In step S202, the node 112 obtains the record number where the copy of the file concerned is written, from the tape drive 132 having copied the file. In step S203, the node 112 further queries the tape drive 132 for the time required for reading the copy of the file concerned, using the record number acquired from the tape drive 132. In step S204, the node 112 obtains, from the corresponding tape drive 132, the time required for reading the copy of the file concerned. In step S205, the node 112 stores the required time obtained, as meta information on the file in the tape medium 134. In step S206, the processes are finished.

Typically, when the tape medium 134 is mounted, the index of the tape medium 134 is read into the memory (or the shared disk), and the meta information, such as the required time described above, is stored in the index on the memory. The updated index on the memory is written onto the tape medium 134 at an index synchronization timing, such as a periodical timing, a timing of file close, or a timing of unmounting of the tape medium 134.

Referring again to FIG. 7, after the processing returns from the process called in step S103, in step S104 the copy manager 230 obtains the time required for reading the copy of each file concerned from the tape medium, which is the copy destination. Here, typically, the required time is obtained from the index updated by the file system for tape 226. In step S105, each file concerned is added together with the required time to a list L2 of files in the pre-migrated state, a certain time is waited for, and the processing loops back to step S101. Here, as shown in FIG. 10(B) for example, the list L2 may be sorted according to the obtained required time to assign the orders. Information on the required time described above is stored in the index of the tape medium 134, thereby allowing information on the required time to be obtained when the list L2 is created again even in the case where the hierarchical storage management system 100 is temporarily stopped and reactivated, for example.

According to the processes shown in FIGS. 7 and 8, a copy of the file from the primary storage tier is timely created on the secondary storage tier.

The processes shown in FIG. 9 are started in S300 in response to the start condition for the stub condition defined in the migration policy being satisfied. In the example shown in FIG. 9, the processes are called at a timing when the disk usage ratio exceeds the first threshold. In step S301, the stub manager 232 determines the file with the minimum required time from the list L2 of the files in the pre-migrated state. In step S302, the stub manager 232 selects the file with the minimum required time, stubs the file concerned on the primary storage tier to bring the file into the migrated state. In step S303, the stub manager 232 deletes the file concerned from the list L2.

In step S304, the stub manager 232 determines whether or not the end condition for the stub condition defined in the migration policy is satisfied. In the example shown in FIG. 9, it is determined whether or not the end condition that the disk usage ratio falls below the second threshold is satisfied. If it is determined that the disk usage ratio is not below the second threshold (NO) in step S304, the processing loops back to step S301, and stubbing the files in the pre-migrated state is continued while assigning the orders according to the required time until the disk usage ration falls below the second threshold. In contrast, if it is determined that the disk usage ratio is below the second threshold in step S304 (YES), the processing is branched to step S305, and the processing is finished. In this case, in response to the predetermined start condition being satisfied again, the processes shown in FIG. 9 are called.

Hereinafter, referring to a flowchart of FIG. 11, a file space management method according to another migration policy executed by a hierarchical storage management system 100 according to another embodiment of the present invention is described. The file space management method to be described includes a control flow of causing a file to transition from the resident state to the pre-migrated state or the migrated state.

Figure 11:
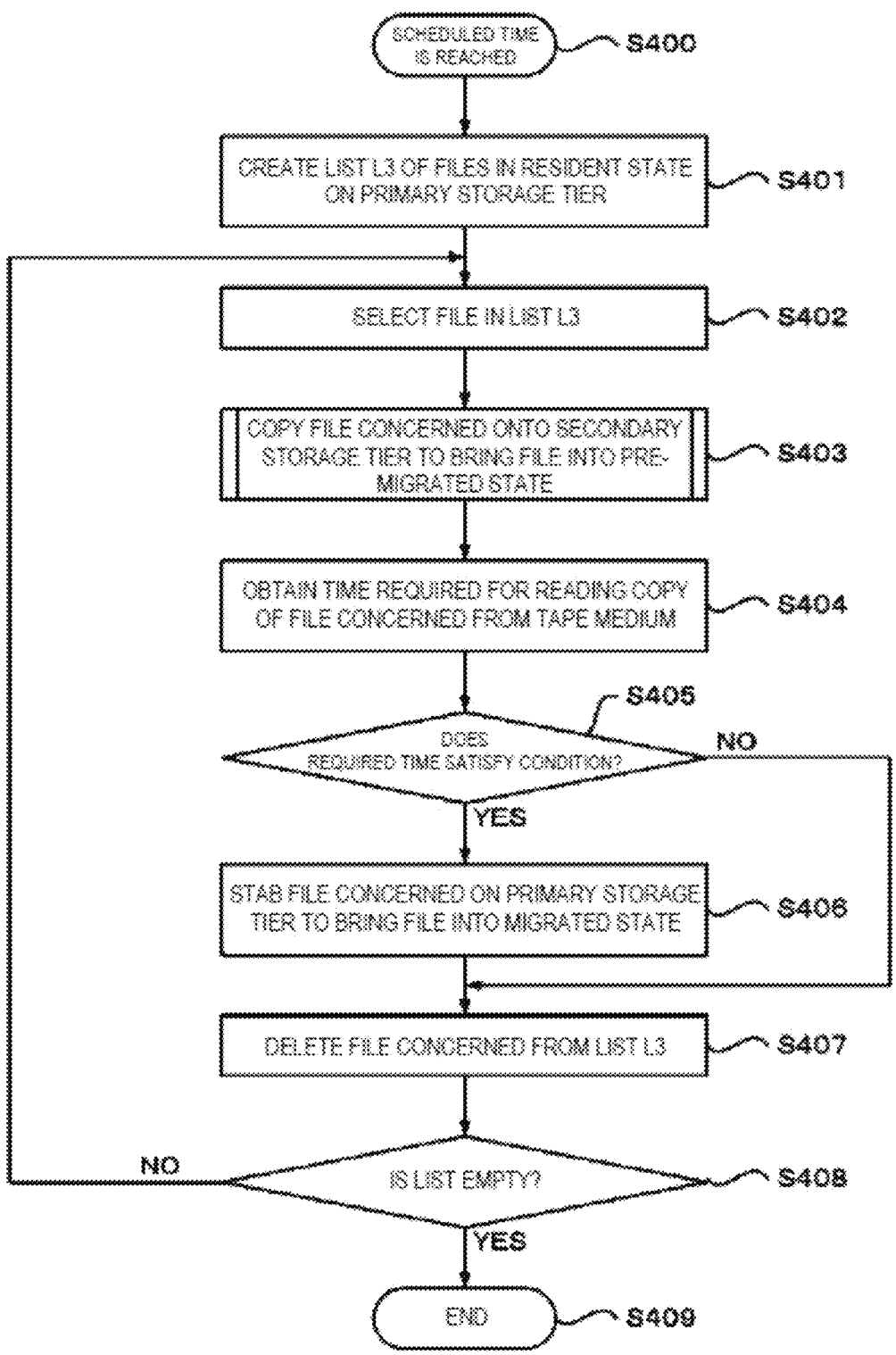
FIG. 11 is a flowchart showing a file space management method according to another migration policy executed by a hierarchical storage management system according to another embodiment of the present invention.

FIG. 11 shows a control flow of causing a file to transition from the resident state to the pre-migrated state or the migrated state, the flow being executed by the a hierarchical storage manager 222 in the hierarchical storage management system 100 according to another embodiment of the present invention. The control shown in FIG. 11 is based on the migration policy that, in response to a scheduled time being reached, copies all the files in the resident state, and stubs the files with the required time satisfying the condition.

The processes shown in FIG. 11 are started in step S400 in response to a start condition of copying and stubbing defined in the migration policy being satisfied. In the example shown in FIG. 11, the processes are called in a timing when a predefined scheduled time is reached. In step S401, the hierarchical storage manager 222 creates a list L3 of files in the resident state on the primary storage tier. For example, as shown in FIG. 10(A), the list L3 may be sorted according to the last access date and time to assign the orders.

In step S402, the hierarchical storage manager 222 selects files in the list L3. For example, the files may be selected according to the last access date and time. In step S403, the hierarchical storage manager 222 causes a file system for tape 226 to copy the file concerned onto the secondary storage tier to bring the file into the pre-migrated state. Also in step S403 shown in FIG. 11, the process flow shown in FIG. 8 is called. In step S404, the hierarchical storage manager 222 obtains the required time of reading the copy of the file concerned from the tape medium, which is the copy destination. Here, typically, the required time is obtained from the index updated by the file system for tape 226.

In step S405, the hierarchical storage manager 222 determines whether or not the required time satisfies the predetermined condition. The predetermined condition may be, for example, that the required time is shorter than a threshold. If it is determined that the required time satisfies the predetermined condition (YES) in step S405, the processing is branched to step S406. In step S406, the hierarchical storage manager 222 stabs the file on the primary storage tier to bring the file into the migrated state. If it is determined that the required time does not satisfy the predetermined condition (NO) in step S405, the processing is branched to step S407 to leave the file concerned in the pre-migrated state. In step S407, the hierarchical storage manager 222 deletes the file concerned from the list L3, and the processing proceeds to step S408.

In step S408, the hierarchical storage manager 222 determines whether or not the list L3 is empty. If it is determined that the list L3 is not empty (NO) in step S408, the processing loops back to step S402, and the processes are repeated until the list contains no file in the resident state. If it is determined that the list L3 is empty (YES) in step S408, the processing is branched to step S409, and the processing is finished. In this case, in response to the predetermined start condition being satisfied again, the processes shown in FIG. 11 are called.

In the embodiment described with reference to FIG. 11, description has been made assuming that the threshold is fixed. Alternatively, in another embodiment, the threshold may be changed according to situations. For example, in the state where the disk usage ratio is high, a longer threshold is adopted to lower the hurdle against stubbing. In this case, the changed threshold is applied to files having already transitioned to the pre-migrated state based on the previous threshold. Accordingly, control may be performed that newly creates a list of the files having already transitioned to the pre-migrated state when the threshold is changed, redetermines the pre-migrated files in the list using the changed threshold, and stubs the files satisfying the condition.

In the above embodiment, the files are caused to transition between the resident state, the pre-migrated state and the migrated state, thereby allowing the file space to be managed so as to minimize the number of files having long response times as much as possible. The hierarchical storage management system 100 timely migrates files from the primary storage tier to the secondary storage tier, and the files with long times required for reading remain on the primary storage tier. Accordingly, when the application 160 accesses a file, response is made for a file with a long required time from the primary storage tier, thereby allowing the response time to be reduced. In contrast, a file with a short required time is read from the secondary storage tier for responding. However, the time required for reading itself is relatively short. Accordingly, the response times for all the files can be reduced in view of average.

Figure 12:
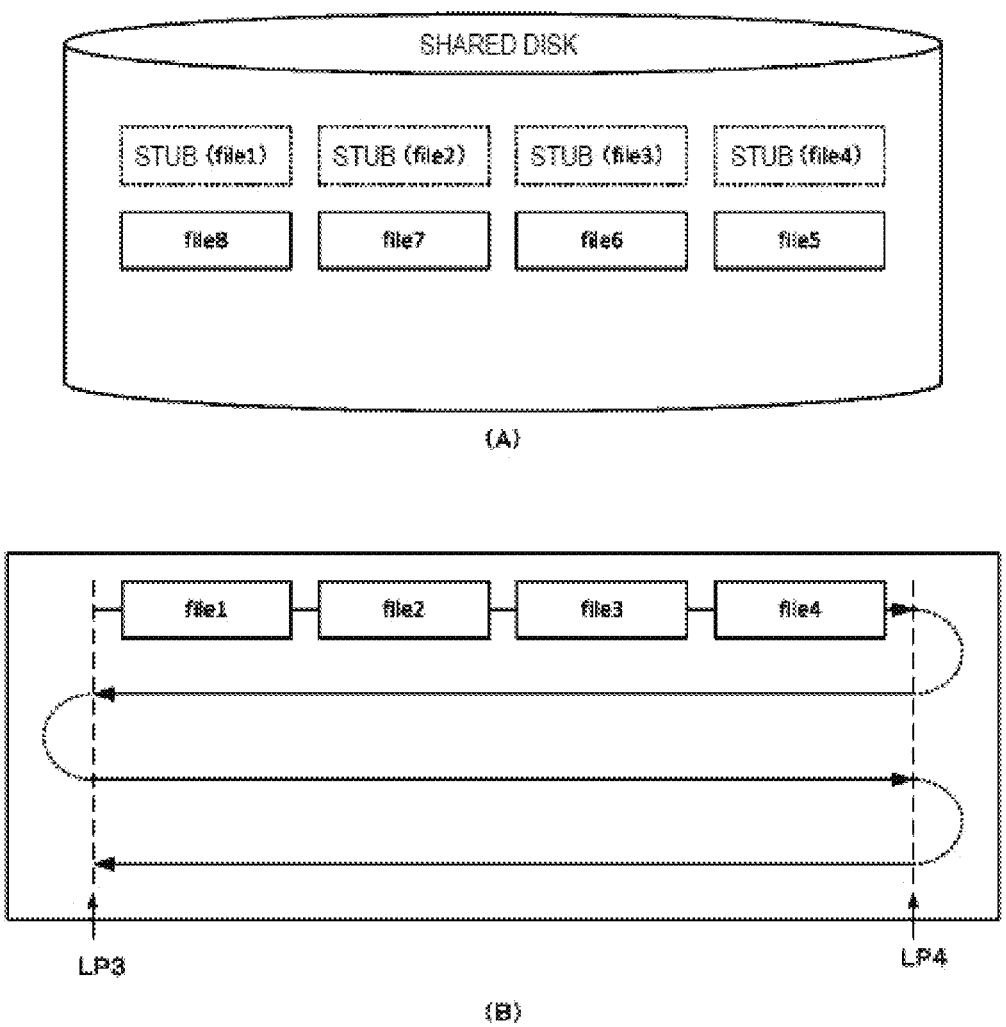
FIG. 12 a diagram showing a result of a file space management function provided by a hierarchical storage management system according to a conventional technique.
Figure 13:
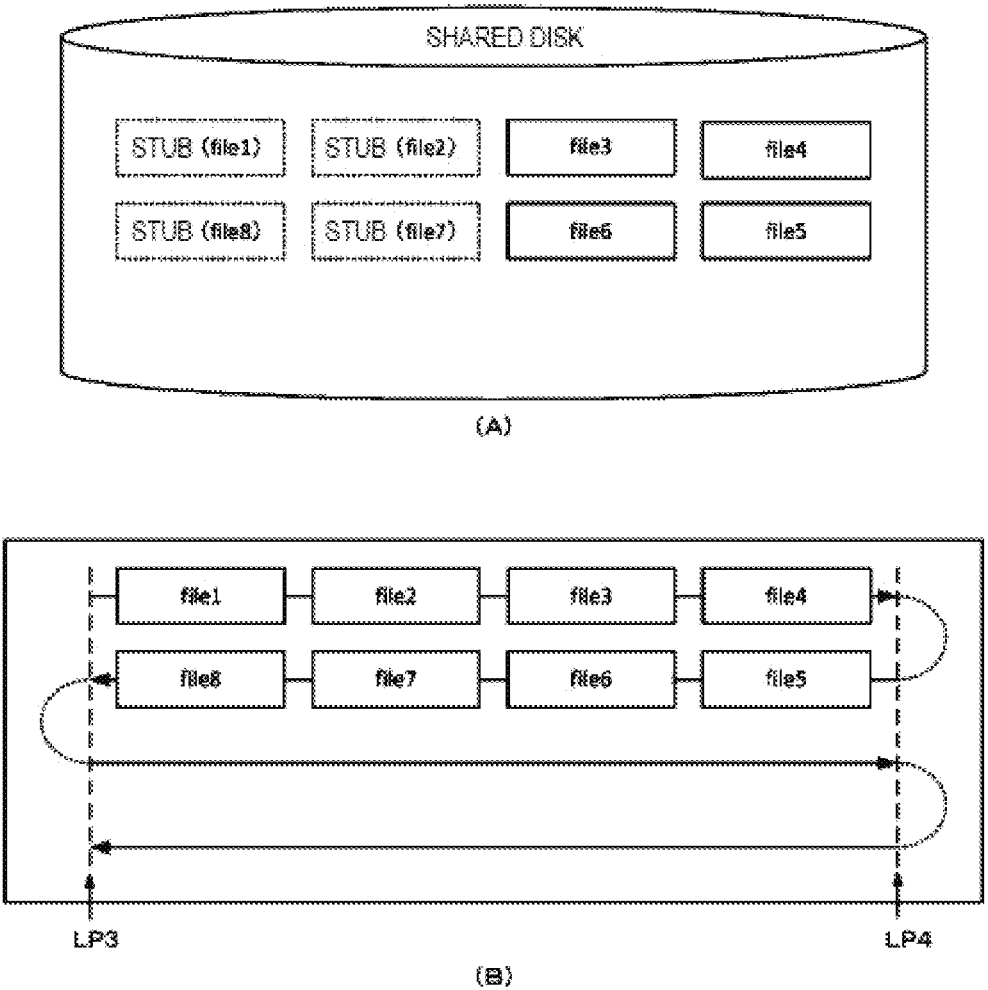
FIG. 13 is a diagram showing a result of a file space management function provided by the hierarchical storage management system according to the embodiment of the present invention.

Hereinafter, referring to FIGS. 12 and 13, advantageous effects of a file space management function provided by the hierarchical storage management system 100 according to the embodiment of the present invention are described. Here, a case is assumed where eight files, "file 1" to "file 8", having equivalent sizes are sequentially stored in the hierarchical storage 150. It is also assumed that four of the files cause the storage usage ratio to exceed the threshold.

Furthermore, a conventional technique is assumed that copies files to the secondary storage, while stubbing the files, in an ascending order of the last access date and time, when the usage ratio exceeds the threshold. In such a conventional technique, as shown in FIG. 12, the first written "file 1" to "file 4" are stubbed, and subsequently written "file 5" to "file 8" remain on the primary storage tier, irrespective of the storage position.

The conventional technique causes files in the resident state to directly transition to the migrated state. On the contrary, in the case of application of control shown in FIGS. 7 and 9, control is performed so as to bring the files in the resident state into the pre-migrated state and to bring files having short required times among the files in the pre-migrated state into the migrated state. Accordingly, as shown in FIG. 13, since files near LP3 are stubbed, the "file 3" to "file 6" near LP4 remain on the primary storage tier. The embodiment of the present invention thus allows files with long locating times on the tape medium to preferentially remain on the primary storage.

In general, if there is no access for a certain time, the tape drive 132 rewinds the mounted tape medium 134, and transitions to an energy-saving wait state. In such a case, sporadic access always results in locating from the beginning of the tape. Accordingly, it is preferred to apply the file space management function of the embodiment of the present invention to the cases of usage of the hierarchical storage 150 for archives accompanying sporadic access.

According to the above description, files to be stubbed are selected with reference to the condition concerning the required time. However, the technique is not limited to this example. Alternatively, for example, a configuration may be adopted that evaluates the file attributes, such as the last access date and time of the file and the file creation date and time, and the required time in a combined manner, and determines files to be stubbed on the basis of the evaluation result.

The embodiments described above can provide the storage management method, storage management system, computer system, and program that can improve the response time for access in the hierarchical storage including the lower storage tier and the higher storage tier.

In the embodiments described above, description has been made exemplifying the tape library that includes one or more tape media as the lower storage tier. The space management function according to the embodiment of the present invention can be specifically preferably applied to such a hierarchical storage that includes the lower storage tier provided with one or more tape media. However, the application is not limited to the hierarchical storage that includes the lower storage tier provided with one or more tape media. For example, there is no intention to prevent application to the hierarchical storage that includes a lower storage tier including one or more HDDs, and a higher storage tier having higher speed. As to an HDD, it has been known that reading time varies between an inner portion and an outer portion of the disk, and, in general, data written in the inner portion requires a long reading time than data written in the outer portion does. In such a hierarchical storage, for example control may be adopted that determines whether or not to stub files according to whether data is written in the outer portion or in the inner portion.

The functions of the present invention can be implemented as machine-executable programs written in any of legacy programming languages, such as an assembler, C, C++, C#, Java®, or an object-oriented programming language. The programs may be stored in a machine-readable recording medium and distributed, or distributed through transmission.

The present invention has been described with reference to specific embodiments. However, the present invention is not limited to the embodiments. Instead, another embodiment may be implemented, and addition, change, deletion and the like may be performed within a scope conceivable by those skilled in the art. Any mode is encompassed by the present invention only if the working effects of the present invention are exerted.

What is claimed is:

1. A storage management method for managing a hierarchical storage including a lower storage tier, and a higher storage tier having higher speed than the lower storage tier, on a computer system including at least one computer, the method comprising the steps, executed by the computer system, of:
copying a target data item from the higher storage tier to the lower storage tier;
and determining whether or not to delete an entity of the data item on the higher storage tier
having been subjected to the copying, based on a time required for reading a copy of the data item being longer than a threshold, wherein the length of the threshold is based on a disk usage ratio.

2. The storage management method according to claim 1, wherein the lower storage tier includes at least one tape medium, and the step of determining based on the required time is a step of determining whether or not to delete the entity of the data item having been subjected to the copying, based on the time required for reading the copy of the data item according to a storage position on the tape medium as a copy destination on the lower storage tier.

3. The storage management method according to claim 2, further comprising a step of deleting the entity of the data item having been subjected to the copying and being determined to be deleted from the higher storage tier, and storing, on the higher storage tier, information for accessing the copy of the data item on the tape medium as the copy destination on the lower storage tier.

4. The storage management method according to claim 2, wherein the copying step includes the steps of:
instructing a tape drive device on the lower storage tier to copy the target data item onto the tape medium;
obtaining information on the time required for reading the copy of the target data item from the tape medium as the copy destination by querying the tape drive device with information on a logical position of the copy; and
storing the obtained information on the required time in association with the target data item.

5. The storage management method according to claim 2, wherein the step of determining based on the required time performs determination based on a time required for locating on the tape medium as the copy destination, or a total time of the time required for locating and a time required for reading after the locating.

6. The storage management method according to claim 2, wherein the step of determining based on the required time includes a step of:
adopting, as a determination target, a data item having been copied to the lower storage tier but having an entity having not been deleted from the higher storage tier.

7. The storage management method according to claim 6, wherein the step of determining based on the required time further includes the steps of:
assigning orders to each of one or more data items adopted as the determination targets, based on the required time; and
selecting a data item whose entity is to be deleted, among the one or more data items adopted as the determination target, based on a result of the assigning the orders.

8. The storage management method according to claim 1, wherein the step of determining based on the required time further evaluates an attribute of the data item, and determines whether or not to delete the entity.

9. The storage management method according to claim 1, wherein the copying step includes a step of determining the target data item based on an attribute of the data item.

10. A storage management system including at least one computer, for managing a hierarchical storage including a lower storage tier, and a higher storage tier having higher speed than the lower storage tier, the system comprising a processor, wherein the processor is configured to:
copy a target data item from the higher storage tier to the lower storage tier; and
determine to delete an entity of the data item on the higher storage tier having been subjected to the copying, based on a time required for reading a copy of the data item being longer than a threshold, and based on a disk usage ratio being above a threshold.

11. The storage management system according to claim 10, wherein the lower storage tier includes at least one tape medium, and determining to delete the entity of the data item having been subjected to the copying is based on the time required for reading the copy of the data item according to a storage position on the tape medium as a copy destination on the lower storage tier.

12. The storage management system according to claim 11, wherein the processor deletes the entity of the data item having been subjected to the copying and being determined to be deleted from the higher storage tier, and stores, on the higher storage tier, information for accessing the copy of the data item on the tape medium as the copy destination on the lower storage tier.

13. The storage management system according to claim 11, wherein the processor instructs a tape drive device on the lower storage tier to copy the target data item onto the tape medium, obtains information on the time required for reading the copy of the target data item from the tape medium as the copy destination by querying the tape drive device with resultantly obtained information on a logical position of the copy, and stores the obtained information on the required time in association with the target data item.

14. The storage management system according to claim 13, further comprising at least one tape drive device on the lower storage tier, the device configured to return information on the required time in response to a query with the information on the logical position of the copy.

15. The storage management system according to claim 11, wherein the storage management system comprises the lower storage tier and the higher storage tier, the higher storage tier including at least one type of storage tier.

16. A computer program product for managing a hierarchical storage including a lower storage tier, and a higher storage tier having higher speed than the lower storage tier, the computer program product comprising a computer readable storage medium having program instructions embodied therewith, the program instructions executable by a computer to cause the computer to:
copy a target data item from the higher storage tier to the lower storage tier; and
determine whether or not to delete an entity of the data item on the higher storage tier having been subjected to the copying, based on a time required for reading a copy of the data item being longer than a threshold, wherein the length of the threshold is based on a disk usage ratio;
wherein the computer readable storage medium is not transitory per se.

17. The program product according to claim 16, further comprising deleting the entity of the data item having been determined to be deleted from the higher storage tier, and storing, on the higher storage tier, information for accessing the copy of the data item on the tape medium as the copy destination on the lower storage tier.

18. The system of claim 10, wherein the disk-usage-ratio threshold is 90%.

19. The system of claim 18, wherein data items below a file-size threshold are not determined to be deleted.

20. The system of claim 19, wherein the file-size threshold is 1024 bytes.

* * * * *